US012802366B2

(12) United States Patent
Briel et al.

(10) Patent No.: US 12,802,366 B2
(45) Date of Patent: Nov. 17, 2026

(54) EXERCISE SYSTEM USING AUGMENTED REALITY

(71) Applicants: Louwrens Jakobus Briel, Western Cape (ZA); Liesl Celeste Briel, Western Cape (ZA); Josef Leberer, Aldrans (AT)

(72) Inventors: Louwrens Jakobus Briel, Western Cape (ZA); Liesl Celeste Briel, Western Cape (ZA); Josef Leberer, Aldrans (AT)

(73) Assignee: DUNAMAX FITNESS SAGL, Cham (CH)

( * ) Notice: Subject to any disclaimer, the term of this patent is extended or adjusted under 35 U.S.C. 154(b) by 161 days.

(21) Appl. No.: 18/564,028

(22) PCT Filed: May 24, 2022

(86) PCT No.: PCT/IB2022/054859
§ 371 (c)(1),
(2) Date: Nov. 24, 2023

(87) PCT Pub. No.: WO2022/249066
PCT Pub. Date: Dec. 1, 2022

(65) Prior Publication Data

US 2024/0303939 A1 Sep. 12, 2024

(30) Foreign Application Priority Data

May 24, 2021 (ZA) .................................. 202103304

(51) Int. Cl.
*G06T 19/00* (2011.01)
*G06F 3/01* (2006.01)

(52) U.S. Cl.
CPC ............ *G06T 19/006* (2013.01); *G06F 3/014* (2013.01); *G06F 3/016* (2013.01)

(58) Field of Classification Search
CPC ........ G06T 19/006; G06F 3/014; G06F 3/016
See application file for complete search history.

(56) References Cited

U.S. PATENT DOCUMENTS 10,684,692 B2 * 6/2020 Aleem .................... G06F 3/017
2012/0249797 A1 10/2012 Haddick et al.
(Continued)

FOREIGN PATENT DOCUMENTS

WO WO-2019032498 A1 * 2/2019 ........... A61N 1/0456

OTHER PUBLICATIONS

International Search Report (ISR) and Written Opinion (WO) mailed on Oct. 19, 2022 in connection with International Application PCT/IB2022/054859, 11 pages.

*Primary Examiner* — Xiao M Wu
*Assistant Examiner* — Ahmed Taha
(74) *Attorney, Agent, or Firm* — DiPerna Law Firm, P.C.

(57) ABSTRACT

An exercise system is provided comprising an augmented reality (AR) device worn by or fitted to a user, the AR device being adapted to display virtual digital content which the user can view and interact with; and a haptic feedback arrangement adapted to be worn or held by at least one hand of the user. The haptic feedback arrangement includes a tracking unit to track the movement of at least one of the user's hands so as determine an action by the user in response to the digital content viewed by the user via the AR device, the haptic feedback arrangement further including a haptic actuator to generate a haptic or tactile response that can be felt by the user's hand/s in response to the user's action. The haptic feedback arrangement is integrated into or secured to a hand device, which comprises either a glove arranged to be fitted to the user's hands or a handheld body that can held by the user.

16 Claims, 6 Drawing Sheets

(56) References Cited

U.S. PATENT DOCUMENTS

| | | | | |
|---|---|---|---|---|
| 2013/0286004 | A1* | 10/2013 | McCulloch | G06T 19/006 345/419 |
| 2015/0193983 | A1* | 7/2015 | Katz | G06F 1/00 345/419 |
| 2016/0271475 | A1 | 9/2016 | Jeffery et al. | |
| 2017/0039986 | A1* | 2/2017 | Lanier | G09G 5/003 |
| 2018/0356893 | A1 | 12/2018 | Soni | |
| 2019/0101984 | A1* | 4/2019 | Talati | G06N 20/00 |
| 2019/0103033 | A1* | 4/2019 | Lu Hill | G09B 5/02 |
| 2020/0073482 | A1* | 3/2020 | Levesque | G06F 18/24 |
| 2020/0150435 | A1* | 5/2020 | Rodriguez, II | G06F 3/0362 |

* cited by examiner

EXERCISE SYSTEM USING AUGMENTED REALITY

CROSS-REFERENCE TO RELATED APPLICATIONS

This application is a National Phase application under 35 U.S.C. 371 of International Application No. PCT/IB2022/054859 filed on May 24, 2022, which application is based upon and claims the benefit of priority from South African Patent Application No. 2021/03304 filed on May 24, 2021, the disclosures of each of which are incorporated herein in their entireties by reference.

FIELD OF THE INVENTION

This invention relates to an exercise system using augmented reality (AR), and in particular to a system to provide an interactive, immersive fitness experience using AR.

SUMMARY OF THE INVENTION

According to the invention, there is provided an exercise system comprising:

- an augmented reality (AR) device worn by or fitted to a user, the AR device being adapted to display virtual digital content which the user can view and interact with; and
- a haptic feedback arrangement adapted to be worn or held by at least one hand of the user, the haptic feedback arrangement including a tracking unit, such as an inertial measurement unit which supports 6DOF tracking, to track the movement of at least one of the user's hands in response to the virtual digital content viewed by the user via the AR device, the haptic feedback arrangement further including a haptic actuator to generate a haptic or tactile response that can be felt by the user's hand/s in response to the movement of the user's hand.

In an embodiment, the haptic feedback arrangement is integrated into or secured to a hand device, which comprises either a glove arranged to be fitted to the user's hands or a handheld body that can be held by the user.

In one version, the inertial measurement unit which supports 6DOF tracking is arranged to detect a hand movement such as a punch thrown by the user in response to the virtual digital content viewed by the user via the AR device, with the haptic actuator being arranged to generate the haptic or tactile response that can be felt by the user's hand/s at the end of the hand movement such as a thrown punch.

In a first version, the inertial measurement unit measures the acceleration of the user's hand/s as the hand/s moves along an axis that is aligned to the direction of travel of the user/s hand, with the haptic feedback arrangement including a processor that receives the measured acceleration, so that when the measured acceleration exceeds an acceleration threshold, the processor detects the end of the movement, such as a punch being thrown, which in turn triggers the haptic actuator to generate the haptic or tactile response.

In a second version, the digital content includes a digital object such as a virtual punch pad, which appears as a hologram, only visible to the user through the AR device. The digital content typically takes the form of a training program in which the user is prompted to perform a series of movements (i.e. punches, in this case).

In an embodiment, the inertial measurement unit measures the orientation (by measuring the angular, gyroscopic position) and acceleration of the user's hand/s as the hand/s moves along an axis that is aligned to the direction of travel of the user/s hand, with the haptic feedback arrangement including a processor that:

- receives the measured orientation and acceleration, so that when the measured acceleration exceeds an acceleration threshold, the processor detects the end of the movement e.g. that a punch has been thrown;
- determines the physical spatial position of the user's hand during or at the end of the user's movement;
- compares the physical spatial position of the user's hand during or at the end of the user's movement to the position of the digital object as viewed by the user through the AR device; and
- if the positions are aligned or at least substantially aligned, corresponding in this example to the virtual punch pad being struck or contacted by the user, the processor triggers the haptic actuator to generate the haptic or tactile response.

Thus, in this second version, a haptic or tactile response is generated, corresponding to a successful strike of the virtual digital object, if the position of the user's hand/s, at the end of the movement, is deemed by the system to be within a three-dimensional volume of space, with reference to the position, orientation and size of the digital object, such as a virtual punch pad.

In an embodiment, the haptic feedback arrangement includes a motor driver to drive a motor that in turn actuates an eccentric rotating mass to provide the haptic or tactile response in the form of a vibration or pressure that can be felt by the user's hands, at the same time (or substantially the same time that) the processor detects the end of the user's movement (i.e. that a punch has been thrown, in this example).

AR Glasses

In an embodiment, the AR device comprises AR glasses arranged to be fitted and secured over the user's eyes. The AR glasses are arranged to work in conjunction with a related computing device such as a compatible smart phone, tablet etc. running a software application, which is arranged to control the AR glasses, such as the Nreal AR glasses. As is relatively well known, the AR glasses includes a processor connected to cameras to capture the user's environment and movement, a display to display the digital content to the user, and an inertial measurement unit that is part of a body of the AR glasses, to track the position and movement (orientation and acceleration, in particular) of the user's head.

In respect of the haptic feedback arrangement, the computing device is a separate device that connects wirelessly with the haptic feedback arrangement via a wireless module in the haptic feedback arrangement and a corresponding wireless module in the computing device.

The computing device (i.e. a smart phone) includes a processor that is arranged to receive or compile, and then send, display control signals to the processor of the AR glasses (and ultimately to the display). These signals vary according to the selected training program, which in turn would determine the digital content displayed to the user. The various digital content for display may be stored either locally, in a memory device which the processor of the computing device can access. Additional digital content for display may also be downloaded from a cloud/web service application or from an Application Store.

As indicated above, the digital content includes at least an instance of a digital object, such as a virtual punch pad, which appears as a hologram, only visible to the user who is wearing the AR Glasses. In one example, the virtual punch pad comprises a plurality of virtual striking zones, with the processor of the AR glasses being arranged to display a virtual target moving from the periphery towards the virtual punch pad, and landing in one of the virtual striking zones.

The processor of the computing device is further arranged to receive signals from the inertial measurement unit within the haptic feedback arrangement, including the position and movement (orientation and acceleration, in particular) of the user's hands, to determine haptic control signals. The haptic control signals are in turn sent back to the processor of the haptic feedback arrangement, to trigger the haptic actuator to generate the haptic or tactile response. Thus, in this version, instead of the processor of the haptic feedback arrangement triggering the haptic actuator to generate the haptic or tactile response, as indicated above, the processor of the computing device performs this function.

In an embodiment, instead of or in addition to the processor of the haptic feedback arrangement determining the physical spatial position of the user's hand at the end of the movement, the processor of the AR glasses, in conjunction with the cameras of the AR glasses, is adapted to determine the physical spatial position of the user's hand at the end of the movement.

In an embodiment, in the case of the user using both left and right hands, the processor of the haptic feedback arrangement and/or the processor of the AR glasses is adapted to determine which hand has reached the end of the movement, and thus which hand has made contact with the virtual object, such as the virtual punch pad.

In an embodiment, the exercise system further comprises a foot sensor that is adapted to be fitted to the user's foot or shoe. In an embodiment, the foot sensor comprises an inertial measurement unit to track movement of the user's lower body, and in particular, the position and movement (orientation, acceleration and cadence, in particular) of at least one of the user's feet, and a wireless module (such as Bluetooth BLE modules) that can communicate with the wireless module of the computing device.

In an embodiment, the foot sensor includes a processor to control a haptic actuator to generate a haptic or tactile response that can be felt by the user's foot, in response to the tracked movement of the user's lower body. In one version, the inertial measurement unit is used to detect a foot movement such as a kick by the user in response to digital content viewed by the user via the AR glasses, with the haptic actuator being arranged to generate a haptic or tactile response that can be felt by the user's foot at the end of the kick.

In an embodiment, the exercise system includes or can access a heart rate monitor to monitor the user's heart rate and to wirelessly send heart rate data to the wireless module of the computing device.

AR Headset

Alternatively, the AR device is integrated into an AR headset, such as Microsoft's Hololens, which is a self-contained holographic device that includes all necessary processing. In this version, the AR headset includes a processor connected to cameras to capture the user's environment, a display to display the digital content to the user, and an inertial measurement unit, to track the position and movement (orientation and acceleration, in particular) of the user's head.

The processor of the AR headset is further arranged to manage the operation of the system. In respect of the haptic feedback arrangement, the AR headset includes a wireless module to wirelessly communicate with the haptic feedback arrangement with a corresponding wireless module in the haptic feedback arrangement.

The processor is arranged to receive or compile, and then send, display control signals for the display, these signals varying according to the selected training program, which in turn would determine the digital content that is displayed to the user. The various digital content for display may be stored either locally, in a memory device which the processor can access, or on a cloud/web service application.

As indicated above, the digital content includes at least an instance of a digital object, such as a virtual punch pad, only visible to the user wearing the AR headset. In one example, the virtual punch pad comprises a plurality of virtual striking zones, with the processor of the AR headset being arranged to display a virtual target moving from the periphery towards the virtual punch pad, and landing in one of the virtual striking zones.

The processor of the AR headset is further arranged to receive signals from the inertial measurement unit within the haptic feedback arrangement, including the position and movement (orientation and acceleration, in particular) of the user's hands, to determine haptic control signals. The haptic control signals are in turn sent back to the processor of the haptic feedback arrangement, to trigger the haptic actuator to generate the haptic or tactile response. Thus, in this version, instead of the processor of the haptic feedback arrangement triggering the haptic actuator to generate the haptic or tactile response, as indicated above, the processor of the computing device performs this function.

In an embodiment, instead of or in addition to the processor of the haptic feedback arrangement determining the physical spatial position of the user's hand at the end of the movement, the processor of the AR headset, in conjunction with the cameras of the AR headset, is adapted to determine the physical spatial position of the user's hand at the end of the movement.

In an embodiment, in the case of the user using both left and right hands, the processor of the haptic feedback arrangement or the processor of the AR headset is adapted to determine which hand has reached the end of the movement, and thus which hand has made contact with the virtual object, such as the virtual punch pad.

In an embodiment, the exercise system further comprises a foot sensor that is adapted to be fitted to the user's foot or shoe. In an embodiment, the foot sensor comprises an inertial measurement unit to track movement of the user's lower body, and in particular, the position and movement (orientation, acceleration and cadence, in particular) of at least one of the user's feet, and a wireless module that can communicate with the wireless module of the AR headset.

In an embodiment, the foot sensor includes a processor to control a haptic actuator to generate a haptic or tactile response that can be felt by the user's foot, in response to the tracked movement of the user's lower body. In one version, the inertial measurement unit is used to detect a foot movement such as a kick by the user in response to digital content viewed by the user via the AR headset, with the haptic actuator being arranged to generate a haptic or tactile response that can be felt by the user's foot at the end of the kick.

In an embodiment, the exercise system includes or can access a heart rate monitor to monitor the user's heart rate and to wirelessly send heart rate data to the wireless module of the AR headset.

A person skilled in the art of Augmented Reality would be able to program/create a game using the components as described for either the AR Glasses or the AR Headset. Both types of AR devices accomplish the same thing, i.e. to overlay digital content onto the user's real world environment, give audio instruction/feedback and music via the audio outputs on the AR devices but each device has a different implementation method. It is therefore not necessary to claim two separate embodiments to cover the AR glasses and AR headset separately as a person skilled in the art would understand how to program the system to create the games as are envisioned in this disclosure. For purposes of this disclosure, whenever it refers to the "processor in the computing unit", it similarly refers to the processor as is contained in the AR Headset.

BRIEF DESCRIPTION OF THE DRAWINGS

In the following, exemplary embodiments will be described in greater detail with reference to accompanying drawings, in which.

DETAILED DESCRIPTION OF THE DRAWINGS

Figure 1:
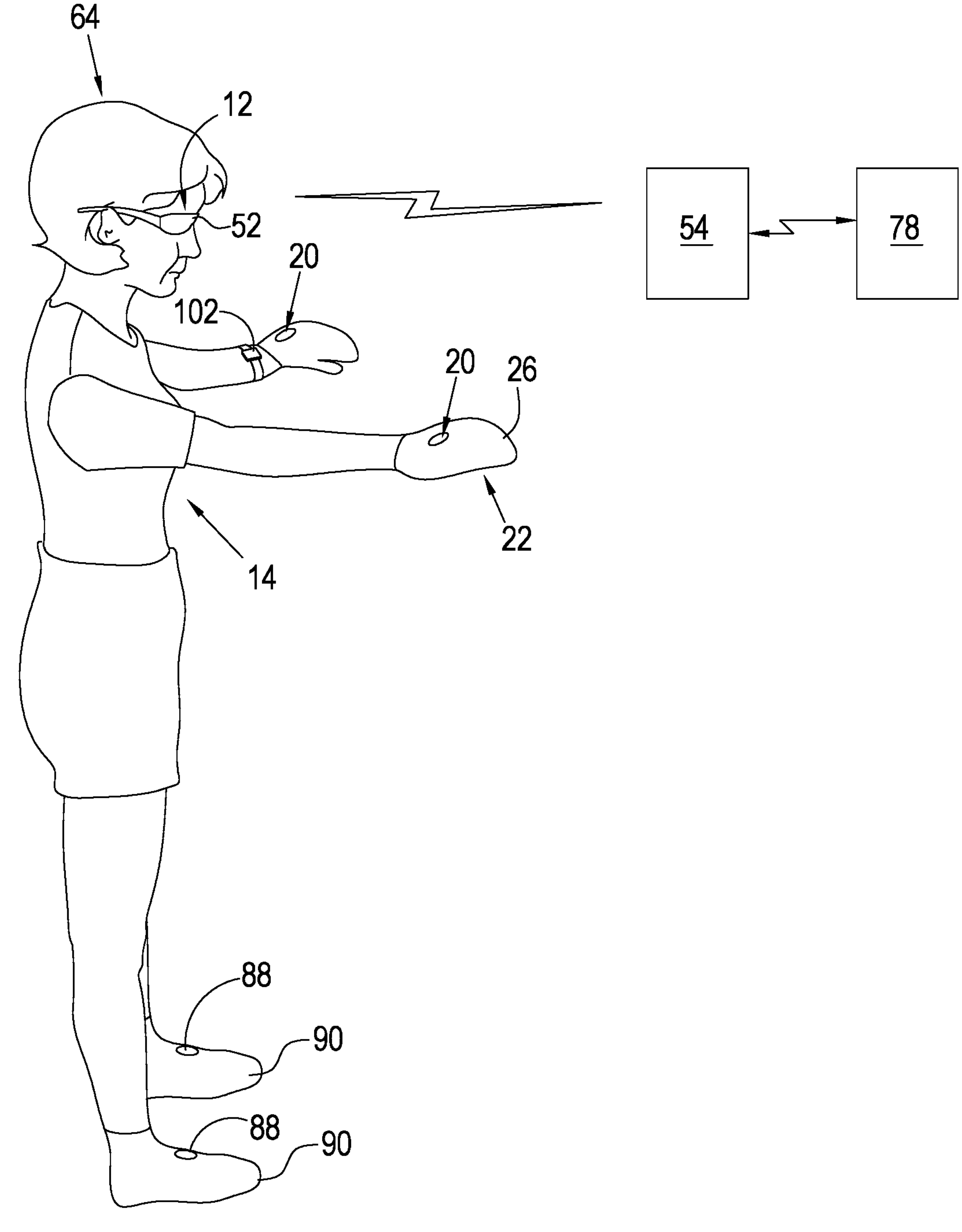
FIG. 1 is a schematic diagram showing the primary components of an exercise system according to the invention, namely an AR device worn by a user, and a haptic feedback arrangement in the form of gloves fitted to the hand of the user.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

Reference to "AR device" includes reference to both the embodiment of the AR glasses and AR headset as both are designed to provide an Augmented Reality experience for the user.

At a high level, with reference to FIGS. 1 and 5 to 8, there is provided an exercise system 10 comprising an augmented reality (AR) device 12 worn by or fitted to a user 14. The AR device 12 is adapted to display virtual digital content 16 in the form of a hologram, of the type shown in FIGS. 5 to 8, which the user 14 (and only the user 14) can view and interact with, while still being able to observe the real world (indicated by the dotted background 18) while exercising.

The system 10 includes a haptic feedback arrangement 20 adapted to be worn or held by at least one hand 22 (or knuckle or wrist) of the user 14. At a high level, the haptic feedback arrangement 20 is arranged to track the position and movement (orientation and acceleration, in particular) of at least one of the user's hands 22, independent of the AR device 12, so as to detect an action by the user in response to the digital content 16 viewed by the user 14 via the AR device 12. In particular, the haptic feedback arrangement 20 is arranged to generate a haptic or tactile response, such as a vibration and/or pressure, that can be felt by the user's hand/s 22 in response to the predetermined movement or action by the user 14.

The haptic feedback arrangement 20 is integrated into or secured to a hand device 24, which comprises, in one embodiment, a glove 26 arranged to be fitted to the user's hands 22, as shown in FIG. 1. Any other functionally similar device may be used, including a wrist strap secured to the user's wrist, a ring that can be worn on a finger, or a handheld body 25 that can be held by the user (of the type shown in FIG. 4, and which will be described in more detail further below). In all cases, the haptic feedback arrangement 20 is constantly in contact with the user's hand 22.

Figure 2:
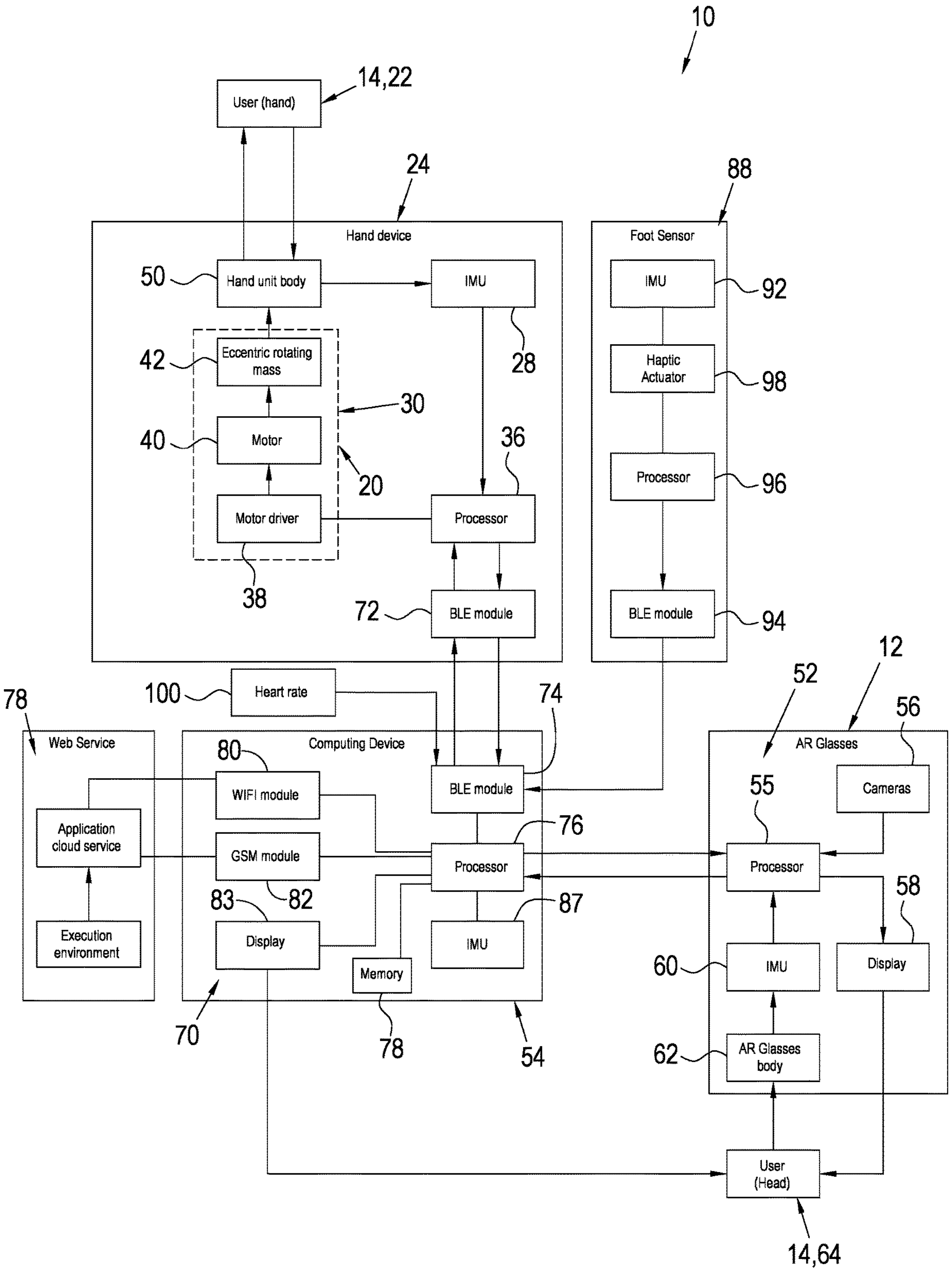
FIG. 2 shows a detailed block diagram of the components of the exercise system shown in FIG. 1, according to a first embodiment in which the AR device comprises AR glasses (of the type shown in FIG. 1)

Turning now to FIG. 2, the haptic feedback arrangement 20 includes an inertial measurement unit 28 to track the position and movement (orientation and acceleration, in particular) of the user's hands 22, independent of the AR device 12, so as to detect a movement or action by the user 14 in response to the digital content 16 viewed by the user 14 via the AR device 12. The haptic feedback arrangement further includes a haptic actuator 30 to generate a haptic or tactile response that can be felt by the user's hands 22 in response to the movement or action by the user 14. The processor 36 uses the position and movement measurements generated by the inertial measurement unit 28 to control the haptic actuator 30.

Figure 7:
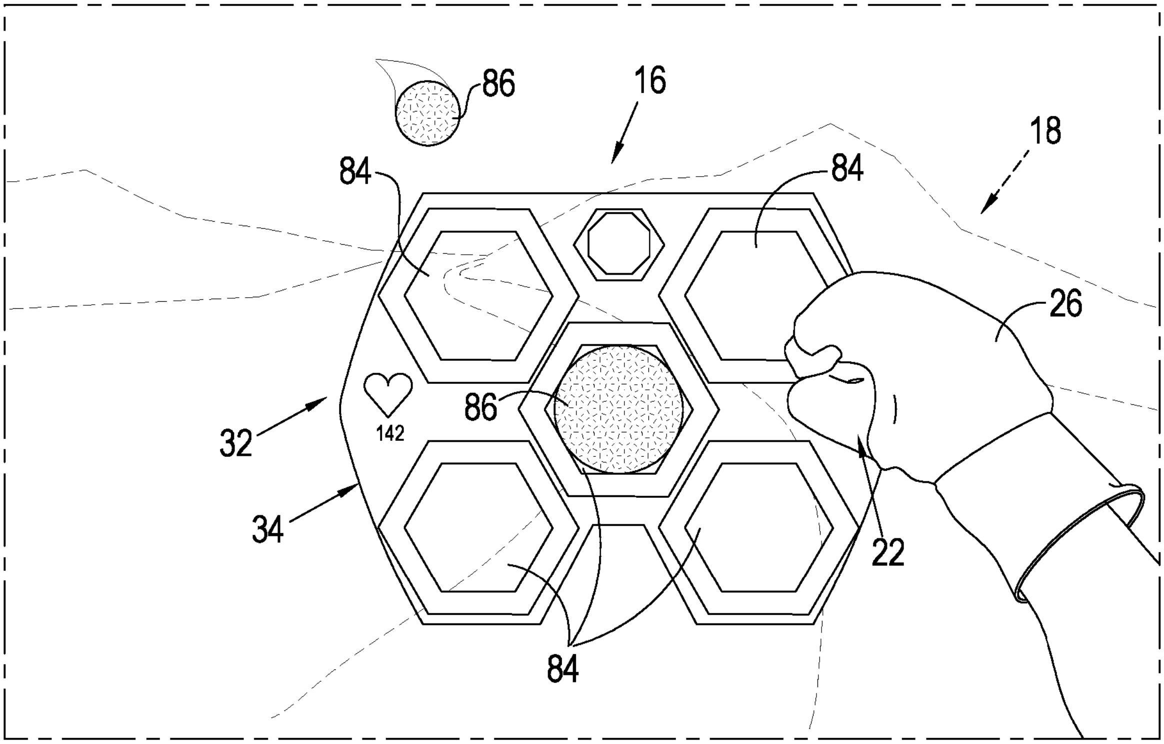

In one application, the inertial measurement unit 28 measures the hand movement and the processor 36 is arranged to detect a hand movement such as a punch thrown by the user 14 in response to the digital content 16 viewed by the user 14 via the AR device 12. In this application, the processor 36 controls the haptic actuator 30 of the haptic feedback arrangement 20 to generate the haptic or tactile response at the end of the thrown punch, so as to mimic the feeling of the user 14 striking a physical object. In this version, as best shown in FIG. 7, the digital content 16 includes a digital object 32 such as a virtual punch pad 34, which appears as a hologram, only visible to the user 14. The user 14 is advantageously still able to observe the real world 18 while exercising. The digital content 16 typically takes the form of a training program in which the user 14 is prompted to perform a series of actions (i.e. punches, in this case), as will be explained in more detail further below.

In a first version, however, the inertial measurement unit 28 only measures the acceleration of the user's hand/s 22 as the hand/s 22 moves along an axis that is aligned to the direction of travel of the user/s hand 22. In this version, the processor 36 receives the measured acceleration, so that when the measured acceleration exceeds an acceleration threshold, the processor 36 detects the end of the movement, such as a punch being thrown, which in turn triggers the haptic actuator 30 to generate the haptic or tactile response.

In a second version, the inertial measurement unit 28 measures both the acceleration and physical spatial position of the user's hand/s 22 with reference to the digital object 32. In particular, the inertial measurement unit 28 measures the orientation (by measuring the angular, gyroscopic rate) and acceleration of the user's hand 22 as they move along an axis that is aligned to the direction of travel of the user's hand 22. The haptic feedback arrangement 20 includes a processor 36 that receives the measured orientation and acceleration, so that when the measured acceleration exceeds an acceleration threshold, the processor 36 detects the end of the movement e.g. that a punch has been thrown.

The processor 36 then determines the physical spatial position of the user's hand 22 at the end of the user's movement, and then compares the physical spatial position of the user's hand 22 at the end of the user's movement to the position of the digital object 32 as viewed by the user 14 through the AR device 12. If the positions are aligned or at least substantially aligned, corresponding in this example to the virtual punch pad 34 being struck or contacted by the user, with reference to FIG. 7 for example, the processor 36 triggers the haptic actuator 30 to generate the haptic or tactile response.

Thus, in this second version, a haptic or tactile response is generated, corresponding to a successful strike of the digital object 32, if the position of the user's hand/s 22, at the end of the movement, is deemed by the system 10 to be within a three-dimensional volume of space, with reference to the position, orientation and size of the digital object 32, such as a virtual punch pad 34.

In an embodiment, the haptic feedback arrangement 20 includes a motor driver 38 to drive a motor 40 that in turn actuates an eccentric rotating mass 42 to provide the haptic or tactile response in the form of a vibration or pressure, at the same time (or substantially the same time that) the processor 36 detects that a hand movement has been made such a punch that has been thrown. Thus, in use, when the acceleration threshold, as measured by the inertial measurement unit 28, is crossed, the processor 36 sends a signal to the motor driver 38. The duration of the signal is pre-programmed into the processor 36. The eccentric rotating mass 42 is part of an eccentric mass assembly, with the motor 40 being arranged to rotate the eccentric mass 42, which in turn causes the vibration.

Figure 4:
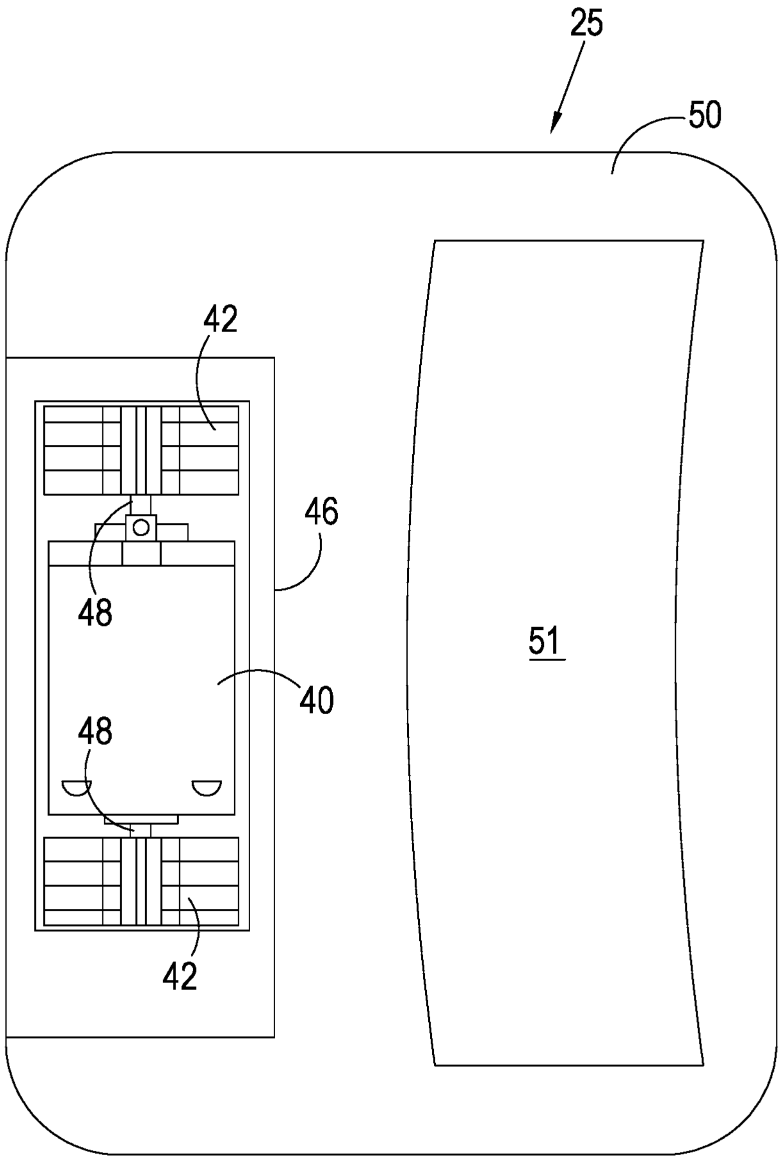
FIG. 4 shows an embodiment of a handheld device (as opposed to the gloves shown in FIG. 1) to accommodate the haptic feedback arrangement.

In one version, as shown in FIG. 4, the haptic feedback arrangement 20 is housed within a plastic housing 50, with there being a pair of eccentric masses 42, each mounted on an axis 48 that protrudes from opposite sides of the motor 40. The vibration is then transferred via a hand unit body 50 to the hand 22 of the user 14, the hand unit body 50 in this case defining a slot 51 for accommodating the user's fingers. The effect of this is that the user 14 experiences a vibration in his/her hands 22 as haptic feedback at the end of the thrown punch, irrespective of the direction or orientation of the hand 22 at the time of the punch. Although not shown, the haptic feedback arrangement 20 includes a firmware module to enable the necessary programming to enable the haptic feedback arrangement 20 to perform the tracking of the hands 22 and provide the haptic feedback response.

In the embodiment shown in FIGS. 1 and 2, the AR device 12 comprises AR glasses 52 arranged to be fitted and secured over the user's eyes. The AR glasses 52, such as the Nreal AR glasses, are arranged to work in conjunction with a related computing device 54 such as a compatible smart phone, tablet etc. running a software application, which is arranged to control the AR glasses 52. As is relatively well known, the AR glasses 52 includes a processor 55 connected to cameras 56 to capture the user's environment and movement, a display 58 to display the digital content 16 to the user 14 (by typically projecting the digital content 16 in front of the user 14), and an inertial measurement unit 60 that is part of a body 62 of the AR glasses 52, to track the position and movement (orientation and acceleration, in particular) of the user's head 64.

Figure 5:
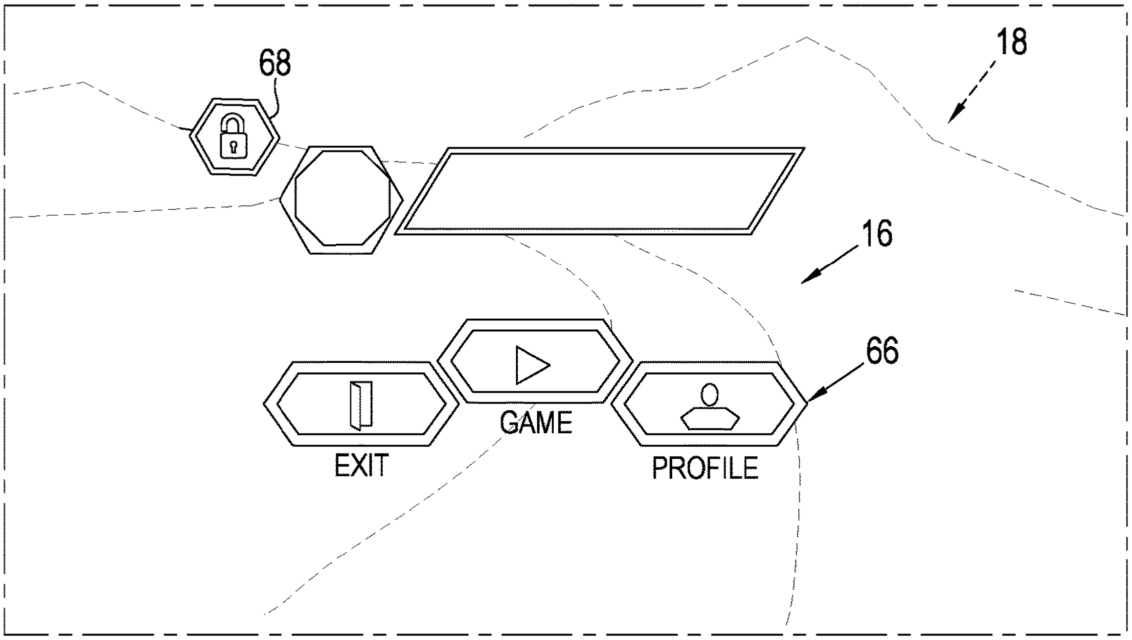
FIGS. 5 to 8 show different various displays of virtual digital content which the user can view and interact with via the AR device.
Figure 6:
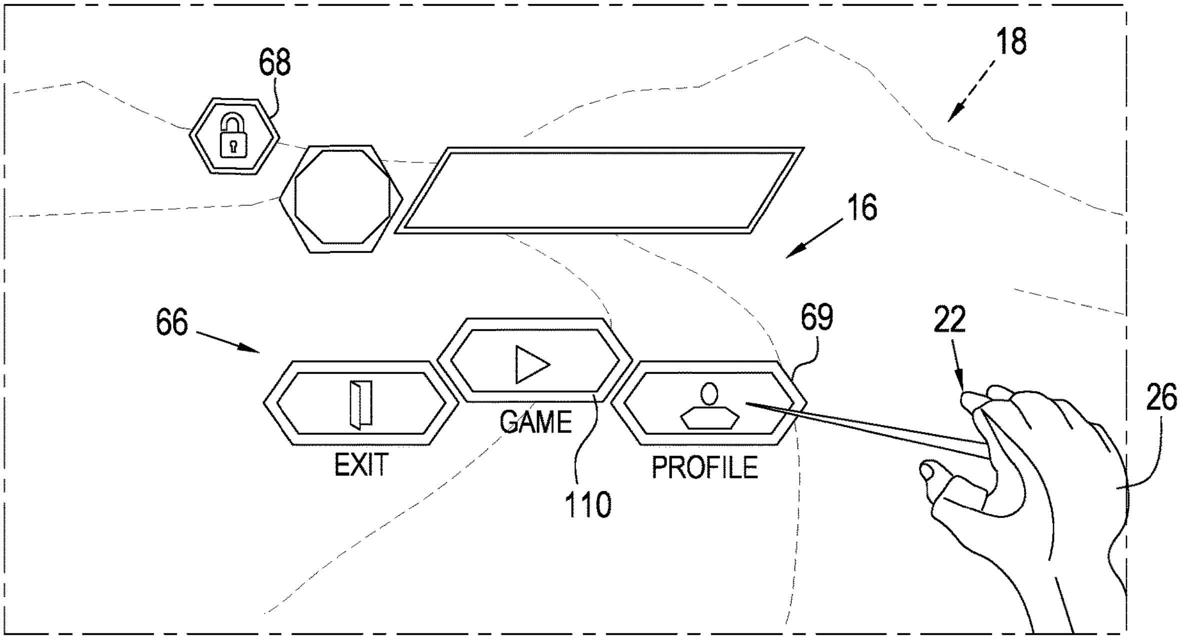

As is well known, as shown in FIGS. 5 and 6, for example, the AR glasses 52 can track the user's hands 22 and determine gestures, to enable the user 14 to select virtual buttons 66. For example, a locking feature 68, upon selection, locks the virtual display 16 relative to the user 14; conversely, an unlocking feature, upon selection, allows the virtual display 16 to move together with the user 14. In another example, the user 14 can access a profile module 69, as shown in FIG. 6, using gestures as determined by the cameras 56 within the AR glasses 52 to view the profile of the user 14.

As indicated the computing device 54 typically takes the form of the user's mobile device 70 itself, or it may comprise a separate computing device, to manage the operation of the system 10. In respect of the haptic feedback arrangement 20, the computing device 70 is a separate device that connects wirelessly with the haptic feedback arrangement 20, via a wireless module 72 (such as a Bluetooth BLE module 72) in the haptic feedback arrangement 20 and a corresponding wireless module 74 in the computing device 70. In an example, the computing device 70 (i.e. the mobile device) is tethered to the AR glasses 52, but a Bluetooth wireless connection may also be used.

The computing device 70 includes a processor 76 that is arranged to receive or compile, and then send, display control signals to the processor 55 of the AR glasses 52 (and ultimately to the display 58). These signals vary according to the selected training program, which in turn would determine the digital content 16 displayed to the user 14. The various digital content for display may be stored either locally, in a memory device 78 which the processor 76 of the computing device 70 can access, or on a cloud/web service application 78 (which the computing device 70 may access using either a Wi-Fi module 80 or a GSM module 82. The computing device 70 includes a display 83 to enable the user 14 to interact with the computing device 70, and an inertial measurement unit 87. In one application, the computing device 70 may be worn by the user 14, with the inertial measurements of the IMU 87 being used by the computing device 70 as reference to determine filter out sensor bias of the inertial measurement unit 28. The cloud/web service application 78 stores the user's exercise training statistics in the cloud and enables competition with other users. The Application Store stores one or more applications for execution by the AR device. An application is a group of instruction, that when executed by a processor, generates media for presentation to the user. Media generated by an application may be in response to inputs received from the user via movement of the HR headset or the AR device. Examples of applications include gaming applications, fitness classes led by real or virtual instructors.

As indicated above, the digital content 16 includes at least an instance of a digital object, such as a virtual punch pad 34, which appears as a hologram, only visible to the user 14 wearing the AR glasses 52. In one example, as best shown in FIG. 7, the virtual punch pad 34 comprises a plurality of virtual striking zones 84, with the processor 76 of the computing device 70 or the processor 55 of the AR glasses 52 being arranged to display a virtual target 86 moving from the periphery towards the virtual punch pad 34, and landing in one of the virtual striking zones 84. This provides a visual cue, with the user 14 then having to respond to the correct digital object 32 and/or virtual target 86 in time and with the correct hand. In this particular example, the aim is for the user 14 to strike the virtual target 86 as it lands in the virtual striking zone 84. This not only provides a physical workout, but also provides a form of cognitive exercise.

In an embodiment, the processor 76 of the computing device 70 compares the position and acceleration of the hand 22 (from the hand device 20) with the position, orientation and size of the virtual, digital object 34 (such as a virtual punch pad) and determines whether the hand 22 has punched within a volume of space that constitutes a hit on the virtual object 34. When the virtual object 34 is hit the processor 76 of the computing device 70 sends a signal to the processor 36 of the hand device 20 which in turn controls the haptic actuator 30 of the hand device 20 to give haptic feedback to the user's hand 22.

In an embodiment, in the case of the user 14 using both left and right hands, the processor 36 of the haptic feedback arrangement 20 or the processor 55 of the AR glasses 52 is adapted to determine which hand has reached the end of the movement, and thus which hand has made contact with the virtual target 86 in the digital object 34. From a cognitive perspective, in one application, the hand movement of the user 14 has to cross over the midline of the user's body to ensure left and right brain hemisphere integration. A successful hand movement is deemed to have taken place if it is delivered within an allotted time period, done with the correct hand and the correct virtual striking zone 84 is struck.

The processor 76 of the computing device 70 is further arranged to receive signals from the inertial measurement unit 28 within the haptic feedback arrangement 20, including the position and movement (orientation and acceleration, in particular) of the user's hands 22, to determine haptic control signals. The haptic control signals are in turn sent back to the processor 36 of the haptic feedback arrangement 20, to trigger the haptic actuator 30 to generate the haptic or tactile response. Thus, in this version, instead of the processor 36 of the haptic feedback arrangement 20 triggering the haptic actuator 30 to generate the haptic or tactile response, as indicated above, the processor 76 of the computing device 70 performs this function.

In an embodiment, the processor 76 of the computing device 70 or the processor 55 of the AR glasses 52 determines the position and movement (orientation and acceleration, in particular) of the user's hands 22 in space and can be used to distinguish between the user's left and right hands 22, and whether (and the speed with which) the user 14 has made contact with the digital object 32 such as the virtual punch pad 34. Instead of, in addition to measuring speed, the user's reaction time is measured, corresponding to the user's delivered response after an indicating signal has been given. Thus, for example, from the moment the fireball virtual target 86 enters the virtual striking zone 84 and turns blue, this is the indicating signal that the user 14 must punch. The reaction time is thus measured from this time up until when the user 14 delivers his/her punch.

In an embodiment, the exercise system 10 further comprises a foot sensor 88 that is adapted to be fitted to the user's foot or shoe 90, as shown in FIG. 1. In an embodiment, the foot sensor 88 comprises an inertial measurement unit 92 to track movement of the user's lower body, and in particular, the position and movement (orientation, acceleration and cadence, in particular) of at least one of the user's feet 90. The foot sensor 88 further comprises a wireless module 94 (such as Bluetooth BLE modules) that can communicate with the wireless module 74 of the computing device 70.

In an embodiment, the foot sensor 88 includes a processor 96 to control a haptic actuator 98 to generate a haptic or tactile response that can be felt by the user's foot 90, in response to the tracked movement of the user's lower body. In one version, the inertial measurement unit 92 is used to detect a kick by the user 14 in response to digital content 16 viewed by the user via the AR glasses 52, with the haptic actuator 98 being arranged to generate a haptic or tactile response that can be felt by the user's foot 90 at the end of the kick.

Figure 8:
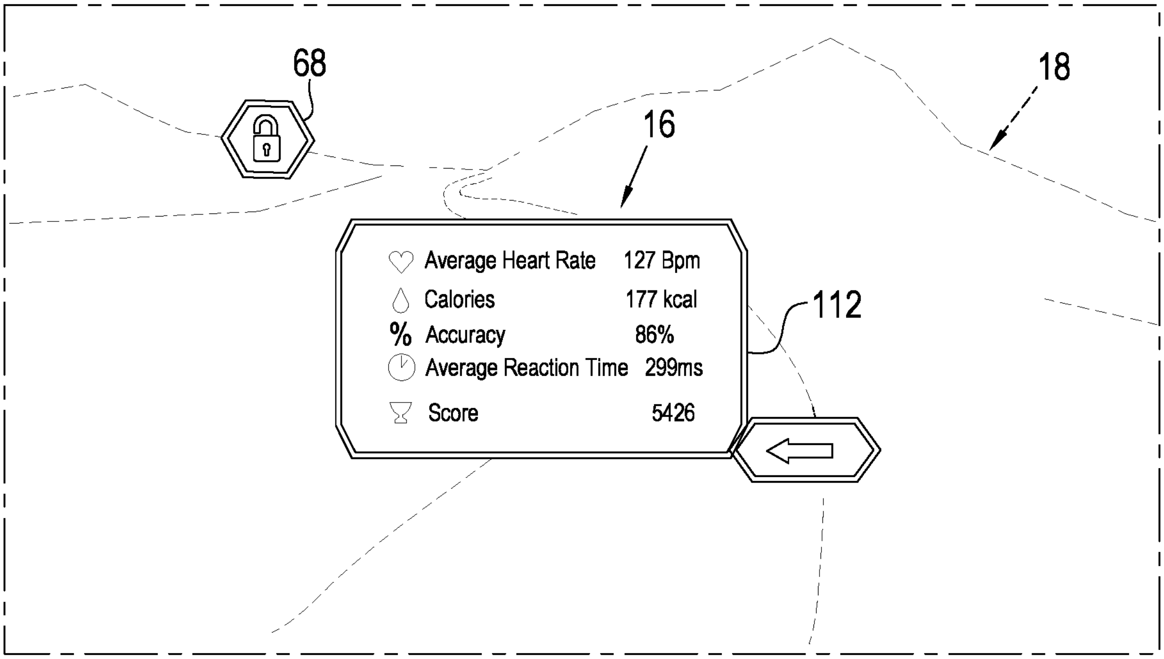

In an embodiment, the exercise system 10 includes or can access a heart rate monitor 100 to monitor the user's heart rate and to wirelessly send heart rate data to the wireless module 74 of the computing device 70. This enables the user's heart rate and related calories burned to be determined and displayed, as shown in FIG. 8. In one version, the exercise can thus integrate with an existing heart rate monitor in the form of a heart rate strap or smart watch 102, via its open API, as shown in FIG. 1, or a custom heart rate monitor may be provided to provide the heart rate data.

Figure 3:
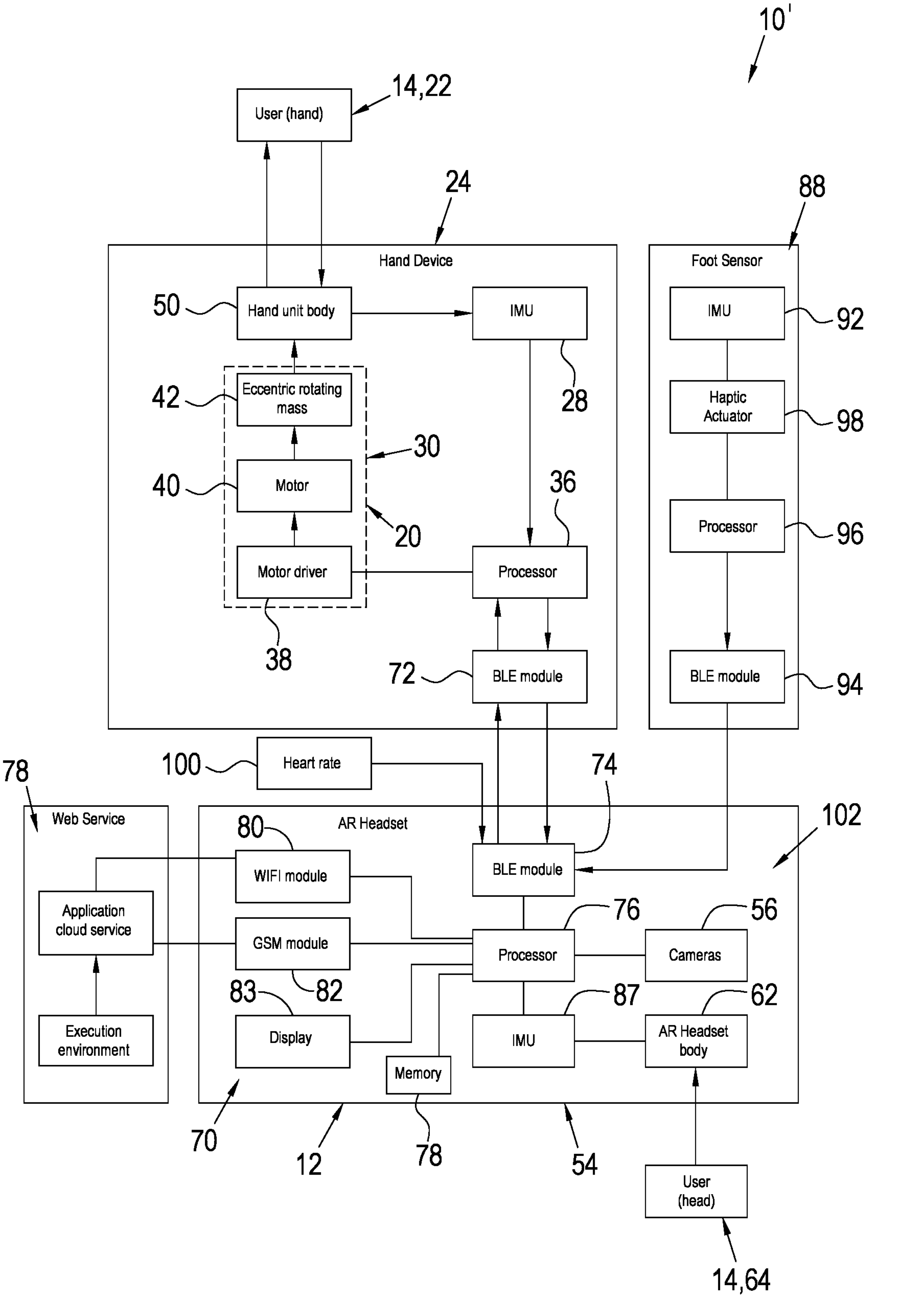
FIG. 3 shows a detailed block diagram of the components of the exercise system shown in FIG. 1, according to a second embodiment in which the AR device comprises an AR headset.

In the embodiment shown in FIG. 3, a modified system 10' is shown in which the AR device 12 takes the form of an AR headset 102 that is arranged to be fitted and secured to the user's head. An example of an AR headset 102 is Microsoft's Hololens, which is a self-contained holographic device that includes all necessary processing. The key difference between the AR glasses 52 of FIG. 2 and the AR headset 102 of FIG. 3 is that the computing device 70 and the AR glasses 52 are now combined into a single AR headset unit. The components of the AR headset 102 and the AR glasses 52 are substantially similar, and thus similar references will be used.

The haptic feedback arrangement 20 of the system 10' and the foot sensor 88 are exactly the same as described above, and will thus not be described again. The only difference is that the wireless modules 72 and 94 in these components exchange data with the wireless module 74 that is now within the AR headset 102 itself.

Thus, the processor 76 of the AR headset 102 is arranged to manage the operation of the system 10'. In respect of the haptic feedback arrangement 20, the AR headset 102 includes the wireless module 74 to wirelessly communicate with the haptic feedback arrangement 20 with the corresponding wireless module 72 in the haptic feedback arrangement 20. In particular, as indicated above, the processor 76 is arranged to receive or compile, and then send, display control signals for the display 58, these signals varying according to the selected training program, which in turn would determine the digital content 16 that is displayed to the user.

As indicated above, the digital content 16 includes at least an instance of a virtual punch pad 34, only visible to the user 14. In one example, the virtual punch pad 34 comprises a plurality of virtual striking zones 84, with the processor 76 of the AR headset 102 being arranged to display the virtual target 86 moving from the periphery towards the virtual punch pad 34, as described above.

The processor 76 of the AR headset 102 is further arranged to receive signals from the inertial measurement unit 28 within the haptic feedback arrangement 20, including the position and movement (orientation and acceleration, in particular) of the user's hands 22, to determine haptic control signals. As described above, the haptic control signals are in turn sent back to the processor 36 of the haptic feedback arrangement 20, to trigger the haptic, tactile response in the form of a vibration and/or pressure.

The remaining components work in substantially the same way as those described above, and will thus not be described in more detail.

In use, and once the user's profile has been set up, as shown in FIG. 6, the user 14 may select any one of a variety of training programs, by accessing the game module 110. Thereafter, the system 10, 10' needs to be calibrated. The calibration varies per action and movement. Due to the fact that different users have different arm lengths and are of different heights, the endpoint of the user's extended hand is not consistent (across users) and therefore unknown to the system. To address this, according to this disclosure, an endpoint calibration operation is first carried out. This calibration operation is now described. During the calibration, the user raises his or her extended arm with the wrist bent upwards in front of the user's body. The cameras/optical sensors in the AR device detect the hand position and specifically the wrist position. The system then calculates the distance from the wrist relative to the IMU in the AR device and also the height of the wrist relative to the IMU in the AR device.

The calibration serves to determine the ideal distance relative to the user at which to set a comfortable, reachable threshold/endpoint. The endpoint location (spatially) is dependent on the user's anatomy and is necessary to be known to the system so that it can display the virtual content to the user relative to that endpoint location. This endpoint location would also be the point in space at which a user would be required to interact with the virtual content. Therefore, the system can ensure that it provides the indicating signal which requires the user's response/interaction, at a set and determinable position in space. It assists the system to recognise when the user is making contact with the virtual content during game play. It also serves to confirm that the user's hand is following the ideal path of travel as would be required by a particular game during game play. Furthermore, if the user chooses to play a game while running outside, it ensures that the virtual content moves with the user and stays at the ideal height and distance relative to the IMU of the AR device while the user moves through space.

The user 14 is prompted to hold his/her hand steady in front of the user, at a comfortable height, for 3 seconds. This allows the spatial cameras the of AR device together with software and processor 76 and/or processor 55 to calibrate the optimal punch distance i.e. how far and high must the virtual target be from the IMU in the AR device. Should the user 14 choose to wear the foot sensors 88, their position relative to the AR device's IMU must also be determined and calibrated. The user 14 will be required to stand still with feet together while the system does the calibration.

Once the calibration is complete, the user 14 has the option of following a tutorial on the required interactions required during a particular game.

Alternatively, the user may start the game. The system would in turn execute the chosen training program and generate various content that the user 14 has to interact with. Thus, in the case of a punching exercise, the number of virtual targets 86, and the speed with which the virtual targets 86 enter the virtual striking zone 84, may vary depending upon the selected level of difficulty. During the training session, the system visually displays the user's biofeedback through the AR Glasses/headset which includes the current heart rate, calorie burn, average reaction time, average hit percentage and a calculated score.

At the end of the training program, a summary scoreboard 112 is determined and presented, as shown in FIG. 8, including the user's average heart rate, the calories burned, the accuracy percentage based on the hand striking the correct virtual striking zone 84 in time and with the correct hand, and the average reaction time taken by the user to strike the virtual targets 86 and the hit percentage which is the average of successful and unsuccessful interactions. The above is the used to calculate the score. All of this data is stored locally in memory 78. If a web service is enabled, the data may be stored there as well.

Although the invention has primarily been described with reference to the user punching a virtual punch pad, this punching exercise or game is only one of a number of exercises or games envisaged. Other examples include a game where the user has to pick apples from a virtual tree and throw them in a virtual basket; or catching virtual fish and throwing them in a basket. The games could also include a virtual obstacle course a user has to follow and to perform certain actions such as lunge, pushups etc. at pre-determined spots along the virtual obstacle course, jumping over virtual obstacles or avoiding approaching obstacles etc. Games include punching and kicking games (e.g., soccer/football/rugby) where virtual objects must be punched, kicked or otherwise struck with virtual handheld swords, sticks etc. Throwing games are also possible where the user is required to throw a virtual object towards a virtual goal.

Another game could include the user simulating jumping rope and the system would virtually display the jumping rope and flying obstacles that a user would have to strike with the center point of the virtual jumping rope.

In an embodiment, the system 10 includes a virtual coach generated by the processor 36, 76 for display to the user 14 via the AR glasses 52 or AR headset 102. The virtual coach may provide motivation, exercise instruction, tips, breathing techniques etc., based on the user's performance. The system 10 may dynamically adjust the training program, based on the user's performance. For example, if the user 14 is struggling with a particular action or movement, the sequence or intensity of the required movements may be made easier or adjusted, and vice versa.

The training programs themselves may range from beginner to professional. At the beginner level, the system would primarily aim to get the user to move and punch in a very basic way, irrespective of the user's form. At the more professional or advanced level, the user would be expected to move in a more particular way, aiming for a more technically correct form. In this case, the exact path of the user's hand would be tracked using the inertial measurement unit 28, and compared to an expected, predefined hand movement path. In this case, the virtual coach would be particularly useful, as the coach could visually and audibly point out the user's deviation from the expected, predefined hand movement path. The training programs may follow a subscription model, where the user will be able to download additional content.

Visual or audio feedback, via the display of the AR device and/or a speaker device built into AR device, may be provided to the user when he or she correctly or incorrectly performs an expected action. This feature is important in the creation of the mixed reality experience, as envisaged by the invention, as the tactile aspect will be given regardless of a correct or incorrect hit. As an example, if the user responded in time and with the correct hand and punched the correct target, a green light could indicate success. Conversely, a red light could indicate an incorrect, late or missed interaction. In addition, together with each tactile feedback regardless of correct or incorrect punches, an audible sound may be emitted to further give the brain feedback that the body has interacted with a digital object.

In use, the system is ideal for use outdoors, as shown in FIGS. 5 to 8, in which the real-world dotted background 18 are mountains, with the user running along a road in the foreground. Thus, the punching game can be played anywhere, even outdoors (as opposed to conventional virtual reality games, which generally need to be played indoors).

Although the invention has largely been described as a standalone exercise system, it could be combined with an existing exercise apparatus, such as a cycling machine or treadmill, to further enhance the overall exercising experience. The AR device may also be integrated with existing gaming consoles, such as the steering wheel type console. In another example, the system can integrate with a compatible "smart bike" which would automatically calculate the cadence, speed travelled and send the data to the processor.

A number of rules may be defined, as follows (some of which have already been described above):

Rule 1: The user must interact with the digital objects in a cross-over manner for brain integration. This means that the left hand must punch/touch/interact with the targets approaching from the right, and vice versa.

Rule 2: When indicated, the user must interact with the digital object in-time, that is, not before the indicating signal has been given (such as a virtual object's change of colour) and not after the maximum allotted time has elapsed. Each game will have unique ways of indicating to the user when the time starts running for the user's response to be given. There can be visual and/or audio cues indicating when the interaction is required. For example, in a punching game, the user must punch the approaching/displaying digital object at the time it turns colour but before it disappears.

Rule 3: The user needs to keep moving his/her lower body. The faster the lower body movement, the higher the calorie burn and the related score. The interaction with digital objects could also be given via the feet and this can be tracked if the user wears the foot sensors. For example, there could be a digital obstacle course that is displayed through the AR glasses which could require the user to jump over, step on, side-step the virtual objects etc.

The common elements of all the games are the following: the game will present the user with virtual content/elements with which to react. There will be a clear visual signal to the user when the required interaction is required. From that moment the timer starts ticking and the user's reaction time will be measured. The user furthermore must deliver a correct response which is a combination of reacting within the allotted time, using the correct hand and/or foot to deliver the action and reacting to the correct digital element. This ensures that the user exercises his/her decision-making abilities under pressure. If the user combines playing the game with exercising on a cardio fitness device, the user will have a higher calorie burn but also be under additional mental pressure to perform because the body will be more fatigued and training the decision-making ability under those conditions result in greater cognitive improvement and development.

The ultimate aim is to create a mixed reality experience in which the real-world merges with the digital world in a tangible way. The invention enables the user to move freely within the real world while interacting with digital objects and holograms, while getting real-time feedback on the user's physical and cognitive performance. The system 10 may of course be used in conjunction with traditional fitness equipment such as treadmills, ellipticals, steppers or mini trampoline etc. The user is also able to use the system without any equipment at all.

A user can expect same or better physical and mental results as when playing sports but with a significantly reduced risk of injury, in a lesser amount of time and using it with the user's already owned cardio equipment.

The invention claimed is:

1. An exercise system comprising:

an augmented reality (AR) device worn by or fitted to a user, the AR device being adapted to display virtual digital content which the user can view and interact with, wherein the digital content includes a digital object which appears as a hologram, only visible to the user through the AR device, and wherein the digital content takes the form of a training program in which the us is prompted to perform a series of movements; and a haptic feedback arrangement adapted to be worn or held by at least one hand of the user, the haptic feedback arrangement including a tracking unit to track the movement of at least one of the user's hands in response to the digital content viewed by the user via the AR device, the haptic feedback arrangement further including a haptic actuator to generate a haptic or tactile response that can be felt by the user's hand/s in response to the movement of the user's hand, wherein the tracking unit includes an inertial measurement unit that is arranged to detect a hand movement by the user in response to the digital content viewed by the user via the AR device, with the haptic actuator being arranged to generate the haptic or tactile response that can be felt by the user's hand at the end of the hand movement, further wherein the inertial measurement unit measures the orientation and acceleration of the user's hand as the user's hand moves along an axis that is aligned to the direction of travel of the user's hand, with the haptic feedback arrangement further including a processor that is arranged to:

receive the measured orientation and acceleration, so that when the measured acceleration exceeds an acceleration threshold, the processor detects the end of the movement;

determine the physical spatial position of the user's hand at the end of the user's movement;

compare the physical spatial position of the user's hand at the end of the user's movement to the position of the digital object as viewed by the user through the AR device; and if the positions are aligned or at least substantially aligned, the processor triggers the haptic actuator to generate the haptic or tactile response, wherein the haptic feedback arrangement includes a motor driver to drive a motor that in turn actuates an eccentric rotating mass to provide the haptic or tactile response in the form of a vibration, at the same time, or substantially the same time that, the processor detects that a punch has been thrown.

2. The exercise system of claim 1, wherein the haptic feedback arrangement is integrated into or secured to a hand device, which comprises either a glove arranged to be fitted to the user's hands or a handheld body that can be held by the user.

3. The exercise system of claim 1, wherein the AR device is arranged to be fitted and secured over at least the user's eyes, the AR device including a processor connected to cameras to capture the user's environment and movement, a display to display the digital content to the user, and an inertial measurement unit that is part of a body of the AR device, to track the position and movement of the user's head.

4. The exercise system of claim 1, wherein a processor associated with or connected to the AR device connects wirelessly with the haptic feedback arrangement, via a wireless module in the haptic feedback arrangement and a corresponding wireless module connected to the processor of the AR device.

5. The exercise system of claim 1, wherein a processor associated with or connected to the AR device is arranged to receive or compile, and then send, display control signals for the display, with these signals varying according to the selected training program, which in turn would determine the digital content displayed to the user.

6. The exercise system of claim 1, wherein the digital object comprises a virtual punch pad having a plurality of virtual striking zones, with a processor associated with or connected to the AR device being arranged to display a virtual target moving from the periphery towards the virtual punch pad and landing in one of the virtual striking zones.

7. The exercise system of claim 1, wherein a processor associated with or connected to AR device is further arranged to receive signals from the inertial measurement unit within the haptic feedback arrangement, including the position and movement of the user's hands, to determine haptic control signals, with the haptic control signals in turn being sent back to the processor of the haptic feedback arrangement to trigger the haptic actuator to generate the haptic or tactile response.

8. The exercise system of claim 1, wherein a processor associated with or connected to the AR device, in conjunction with the cameras of the AR device, is adapted to determine the physical spatial position of the user's hand at the end of the movement and to then determine haptic control signals, with the haptic control signals in turn being sent back to the processor of the haptic feedback arrangement to trigger the haptic actuator to generate the haptic or tactile response.

9. The exercise system of claim 1, wherein in the case of the user using both left and right hands, the processor of the haptic feedback arrangement or a processor associated with or connected to the AR device is adapted to determine which hand has reached the end of the movement, and thus which hand has made contact with the virtual object.

10. The exercise system of claim 1, wherein the exercise system further comprises a foot sensor that is adapted to be fitted to the user's foot, the foot sensor comprising: an inertial measurement unit to track movement of the user's lower body, including the position and movement of at least one of the user's feet; and a wireless module that can communicate with the wireless module of the AR device or of a computing device associated with the AR device.

11. The exercise system of claim 1, wherein the foot sensor includes a processor to control a haptic actuator to generate a haptic or tactile response that can be felt by the user's foot, in response to the tracked movement of the user's lower body.

12. The exercise system of claim 1, wherein the AR device is arranged to generate audio and/or visual feedback in addition to the haptic or tactile response.

13. The exercise system of claim 1, which further includes or can access a heart rate monitor to monitor the user's heart rate and to wirelessly send heart rate data to the AR device and/or the haptic feedback arrangement.

14. The exercise system of claim 3, wherein the AR device comprises AR glasses arranged to work in conjunction with a computing device running a software application that controls the AR glasses, the computing device being a device separate from the AR glasses and connecting wirelessly with the haptic feedback arrangement via a wireless module in the haptic feedback arrangement and a corresponding wireless module in the computing device, with the computing device being arranged to perform the processing functions associated with the AR device.

15. The exercise system of claim 3, wherein the AR device comprises a self-contained AR headset that includes all processing necessary to operate the exercise system, the AR headset connecting wirelessly with the haptic feedback arrangement via a wireless module in the haptic feedback arrangement and a corresponding wireless module in the AR headset.

16. The exercise system of claim 5, wherein the digital object takes the form of a virtual interactive element other than a virtual punch pad, and the user is prompted to perform a physical movement to interact with the digital object, with a processor associated with or connected to the AR device being arranged to detect the user's physical movement and to generate a corresponding haptic or tactile response via the haptic actuator at the end of the movement.

* * * * *